US011471772B2

(12) United States Patent
Yerli

(10) Patent No.: US 11,471,772 B2
(45) Date of Patent: Oct. 18, 2022

(54) SYSTEM AND METHOD FOR DEPLOYING VIRTUAL REPLICAS OF REAL-WORLD ELEMENTS INTO A PERSISTENT VIRTUAL WORLD SYSTEM

(71) Applicant: THE CALANY HOLDING S.À R.L., Luxembourg (LU)

(72) Inventor: Cevat Yerli, Frankfurt am Main (DE)

(73) Assignee: THE CALANY HOLDING S. À R.L., Luxembourg (LU)

( * ) Notice: Subject to any disclaimer, the term of this patent is extended or adjusted under 35 U.S.C. 154(b) by 15 days.

(21) Appl. No.: 16/902,074

(22) Filed: Jun. 15, 2020

(65) Prior Publication Data
US 2020/0398163 A1 Dec. 24, 2020

Related U.S. Application Data

(60) Provisional application No. 62/862,928, filed on Jun. 18, 2019.

(51) Int. Cl.
*A63F 13/65* (2014.01)
*A63F 13/69* (2014.01)
*G06V 20/64* (2022.01)

(52) U.S. Cl.
CPC ............. *A63F 13/65* (2014.09); *A63F 13/69* (2014.09); *G06V 20/653* (2022.01)

(58) Field of Classification Search
CPC .......... A63F 13/65; A63F 13/69; A63F 13/60; G06T 2219/2021; G06T 19/20; G06K 9/00214; G06F 3/011; G06F 30/20
See application file for complete search history.

(56) References Cited

U.S. PATENT DOCUMENTS 5,883,817 A 3/1999 Chisholm et al.
5,956,039 A 9/1999 Woods et al.
(Continued)

FOREIGN PATENT DOCUMENTS

CN 100484726 C 5/2009
CN 102120325 B 12/2012
(Continued)

OTHER PUBLICATIONS

"Walmart Patent Wants You to Shop at Home Using Virtual Reality," Research Brief, Aug. 17, 2018, <https://www.cbinsights.com/research/walmart-virtual-reality-retail-patent/> [retrieved Jun. 5, 2020], 8 pages.

(Continued)

*Primary Examiner* — Kevin Y Kim
(74) *Attorney, Agent, or Firm* — Christensen O'Connor Johnson Kindness PLLC

(57) ABSTRACT

A system for developing and deploying virtual replicas of real-world elements into a persistent virtual world system. The development of the virtual replicas is performed in a virtual environment that enables development and configuration of the virtual replicas that mirror the behavior and appearance of the corresponding real elements. The virtual replicas are enriched through data captured by sensing mechanisms that synchronize in real-time the virtual replicas with the real-world elements. The virtual replicas are shared in a virtual world-based quality assurance system where they can be either approved or rejected for subsequent adjustments, when necessary. After approval and deployment, the replicas are shared in a deployed persistent virtual world system that is viewable to end users for management and interaction of the virtual replicas. Methods thereof are also disclosed.

20 Claims, 6 Drawing Sheets

(56) References Cited

U.S. PATENT DOCUMENTS

| | | |
|---|---|---|
| 6,278,479 B1 | 8/2001 | Wilson et al. |
| 6,556,206 B1 | 4/2003 | Benson et al. |
| 7,168,051 B2 | 1/2007 | Robinson et al. |
| 7,529,690 B2 | 5/2009 | Hadi |
| 8,326,704 B2 | 12/2012 | Glazer et al. |
| 8,564,621 B2 | 10/2013 | Branson et al. |
| 9,281,727 B1 | 3/2016 | Coley et al. |
| 9,511,291 B2 | 12/2016 | Lyons et al. |
| 9,669,321 B2 | 6/2017 | Reveley |
| 9,704,298 B2 | 7/2017 | Espeset et al. |
| 9,721,386 B1 | 8/2017 | Worley, III et al. |
| 10,565,764 B2 | 2/2020 | Han et al. |
| 2002/0116235 A1 | 8/2002 | Grimm et al. |
| 2002/0191017 A1 | 12/2002 | Sinclair et al. |
| 2003/0030658 A1 | 2/2003 | Gibbs et al. |
| 2006/0122917 A1 | 6/2006 | Lokuge et al. |
| 2006/0184886 A1 | 8/2006 | Chung et al. |
| 2007/0168463 A1 | 7/2007 | Rothschild |
| 2008/0263460 A1 | 10/2008 | Altberg et al. |
| 2009/0055019 A1 | 2/2009 | Stiehl et al. |
| 2009/0244059 A1 | 10/2009 | Kulkarni et al. |
| 2009/0326713 A1 | 12/2009 | Moriya |
| 2010/0131865 A1 | 5/2010 | Ackley et al. |
| 2010/0131947 A1 | 5/2010 | Ackley et al. |
| 2011/0060425 A1 | 3/2011 | Freed |
| 2012/0038667 A1 | 2/2012 | Branson et al. |
| 2012/0133638 A1 | 3/2012 | Davison et al. |
| 2012/0105475 A1 | 5/2012 | Tseng |
| 2012/0149349 A1 | 6/2012 | Quade |
| 2013/0009994 A1 | 1/2013 | Hill |
| 2013/0044106 A1 | 2/2013 | Shuster et al. |
| 2013/0117377 A1 | 5/2013 | Miller |
| 2013/0179576 A1 | 7/2013 | Boldyrev et al. |
| 2014/0063061 A1 | 3/2014 | Reitan |
| 2014/0214504 A1 | 7/2014 | Young et al. |
| 2014/0221090 A1 | 8/2014 | Mutschler et al. |
| 2014/0282220 A1 | 9/2014 | Wantland et al. |
| 2015/0188984 A1 | 7/2015 | Mullins |
| 2016/0300392 A1 | 10/2016 | Jonczyk et al. |
| 2016/0343168 A1 | 11/2016 | Mullins et al. |
| 2016/0379415 A1 | 12/2016 | Espeset et al. |
| 2017/0092223 A1 | 3/2017 | Fain et al. |
| 2017/0203438 A1 | 7/2017 | Guerin et al. |
| 2017/0243403 A1 | 8/2017 | Daniels et al. |
| 2017/0250930 A1 | 8/2017 | Ben-Itzhak |
| 2017/0286572 A1 | 10/2017 | Hershey et al. |
| 2017/0287496 A1 | 10/2017 | Heitkamp et al. |
| 2017/0289202 A1 | 10/2017 | Krasadakis |
| 2017/0358024 A1 | 12/2017 | Mattingly et al. |
| 2018/0040038 A1 | 2/2018 | Vanslette et al. |
| 2018/0047093 A1 | 2/2018 | High et al. |
| 2018/0060948 A1 | 3/2018 | Mattingly et al. |
| 2018/0089903 A1 | 3/2018 | Pang |
| 2018/0173309 A1 | 6/2018 | Uchiyama et al. |
| 2018/0210436 A1 | 7/2018 | Burd et al. |
| 2018/0231973 A1 | 8/2018 | Mattingly et al. |
| 2018/0281193 A1 | 10/2018 | Favis |
| 2018/0342106 A1 | 11/2018 | Rosado |
| 2018/0349108 A1 | 12/2018 | Brebner |
| 2019/0065028 A1 | 2/2019 | Chashchin-Semenov et al. |
| 2019/0102494 A1 | 4/2019 | Mars |
| 2019/0102709 A1 | 4/2019 | Correa |
| 2019/0138970 A1 | 5/2019 | Deutsch et al. |
| 2019/0221036 A1 | 7/2019 | Griffin et al. |
| 2019/0287307 A1 | 9/2019 | Rogers et al. |
| 2019/0361589 A1 | 11/2019 | Yerli |
| 2019/0361797 A1 | 11/2019 | Yerli |
| 2020/0098189 A1* | 3/2020 | Pavloff ............... G06F 3/0346 |
| 2020/0175759 A1 | 6/2020 | Russell et al. |
| 2020/0209949 A1 | 7/2020 | Noris et al. |
| 2020/0210137 A1 | 7/2020 | Noris et al. |
| 2020/0211251 A1 | 7/2020 | Noris et al. |
| 2020/0349735 A1 | 11/2020 | Dine et al. |

FOREIGN PATENT DOCUMENTS

| | | |
|---|---|---|
| DE | 101 28 015 A1 | 12/2001 |
| DE | 10 2005 011 126 A1 | 9/2006 |
| JP | 2005539296 A | 12/2005 |
| JP | 2015502584 A | 4/2013 |
| JP | 2016110245 A | 9/2016 |
| JP | 2016209969 A | 12/2016 |
| KR | 1020180020725 A | 4/2019 |
| WO | 02/063454 A1 | 8/2002 |
| WO | 2008/065458 A2 | 6/2008 |
| WO | 2008/065458 A3 | 6/2008 |
| WO | 2009/029559 A1 | 3/2009 |
| WO | 2013/050473 A1 | 4/2013 |
| WO | 2016/017254 A1 | 2/2016 |
| WO | 2016/077493 A1 | 5/2016 |
| WO | 2016/164178 A1 | 10/2016 |
| WO | 2017/141391 A1 | 8/2017 |
| WO | 2018/074000 A1 | 4/2018 |
| WO | 2019/079826 A1 | 4/2019 |

OTHER PUBLICATIONS

European Search Report dated Jan. 17, 2020, in European Application No. 19176436.4, filed May 24, 2019, 33 pages.
Massachusetts Institute of Technology, "Huggable", Jul. 17, 2013, <http://www.youtube.com/watch?v=Z-8_RhkdvoA> [retrieved Sep. 6, 2019], 2 pages.
Partial European Search Report dated Sep. 9, 2019, in European Application No. 19176436.4, filed May 24, 2019, 18 pages.
Alsamhi, S.H., et al., "Artificial Intelligence-Based Techniques for Emerging Robotics Communication: A Survey and Future Perspectives", Arxiv.Org, Cornell University Library, 201 Olin Library, Cornell University Ithaca, New York, Apr. 25, 2018, pp. 1-10.
Office Action dated Aug. 26, 2020, issued in U.S. Appl. No. 16/903,235, filed Jun. 16, 2020, 21 pages.
Office Action dated Aug. 24, 2020, issued in U.S. Appl. No. 16/903,239, filed Jun. 16, 2020, 19 pages.
Extended European Search Report dated Sep. 14, 2020, issued in European Application No. 20176245.7, 8 pages.
European Search Report dated Nov. 18, 2020, issued in European Application No. 20180856.5, 12 pages.
European Search Report dated Nov. 17, 2020, issued in European Application No. 20180736.9, 13 pages.
European Search Report dated Oct. 27, 2020, issued in European Application No. 20180712.0, 11 pages.
Extended European Search Report dated Nov. 16, 2020, issued in European Application No. 20180885.4, 12 pages.
Extended European Search Report dated Nov. 18, 2020, issued in European Application No. 20180739.3, 12 pages.
Extended European Search Report dated Nov. 18, 2020, issued in European Application No. 20180723.7, 12 pages.
Extended European Search Report dated Nov. 19, 2020, issued in European Application No. 20180869.8, 9 pages.
Office Action dated Jan. 11, 2021, issued in U.S. Appl. No. 16/903,239, filed Jun. 16, 2020, 28 pages.
Office Action dated Jan. 11, 2021, issued in U.S. Appl. No. 16/903,235, filed Jun. 16, 2020, 26 pages.
Microsoft Developer: "Developing Mobile Augmented Reality (AR) Applications with Azure Spatial Anchors—BRK2034", May 14, 2019 (May 14, 2019), pp. 1-8, XP54981052, Retrieved from the Internet: URL:https://www.youtube.com/watch?v=CVmfP8TaqNU [retrieved on Oct. 30, 2020].
Yang, X., et al., "Virtual Reality Tools for Internet-Based Robotic Teleoperation", Proceedings of the Eighth IEEE International Symposium on Distributed and Real-Time Applications, 2004, 5 pages.
Asanuma, K., et al., "User Interface for Remote Operation of a Moving Robot via Internet", 9 pages.
Office Action issued in Japanese Application No. 2019096678, 3 pages.
Office Action dated Feb. 17, 2021, issued in U.S. Appl. No. 16/904,213, filed Jun. 16, 2020, 18 pages.
Extended European Search Report dated Oct. 17, 2019, issued in European Application No. 19176426.5, filed May 24, 2019, 9 pages.

(56) References Cited

OTHER PUBLICATIONS

Korean Office Action dated May 26, 2020, issued in KR Application No. 10-2019-0060412, filed May 23, 2019, 13 pages.
Rajappa et al., "Application and Scope Analysis of Augmented Reality in Marketing using Image Processing Technique" (2016).
Office Action dated Aug. 6, 2020, in U.S. Appl. No. 16/421,155, filed May 23, 2019, 26 pages.
Office Action dated Feb. 12, 2021, in U.S. Appl. No. 16/421,155, filed May 23, 2019, 26 pages.
Office Action dated Nov. 19, 2020, issued in Japanese Application No. 2019096980, 42 pages.
WEB+DB Press, vol. 32, May 25, 2006, ISBN 4-7741-2752-3, p. 10-17.
Micheal Lanham, "Unity AR" (Japanese version), Sep. 1, 2017, ISBN 978-4-87311-810-9, 26 pages.
Jeffrey Richter, "Windows Runtime" (Japanese version), Jun. 9, 2014, ISBN 978-4-8222-9831-9, pp. 291-300.
Yoshiyuki Hashimoto, "iOS iBeacon/GeoFence/Navi/CoreMotion/M7" (Japanese version) Mar. 1, 2014, ISBN 978-4-7980-4070-7, pp. 82-94.
Office Action dated Apr. 26, 2021, issued in U.S. Appl. No. 16/903,227, filed Jun. 16, 2020, 40 pages.
Klas et al., "VR is on the Edge: How to Deliver 360° Videos in Mobile Networks," VR/AR Network '17, ACM, Aug. 2017, pp. 30-35.
Foley et al., "KD-Tree Acceleration Structures for a GPU Raytracer," Graphics Hardware 2005, ACM, Jul. 2005, pp. 15-22.
DiVerdi et al., "Level of Detail Interfaces," Proc. Third IEEE and ACM Int'l Conf. on Mixed and Augmented Reality (ISMAR 2004), 2 pages.
Office Action dated Jun. 15, 2022, issued in U.S. Appl. No. 16/903,254, filed Jun. 16, 2020, 14 pages.
European Search Report dated Jun. 27, 2022, issued in European Application No. 20180712.0, 9 pages.

\* cited by examiner

SYSTEM AND METHOD FOR DEPLOYING VIRTUAL REPLICAS OF REAL-WORLD ELEMENTS INTO A PERSISTENT VIRTUAL WORLD SYSTEM

CROSS-REFERENCE TO RELATED APPLICATION

This application claims the benefit of Provisional Application No. 62/862,928, filed Jun. 18, 2019, the entire disclosure of which is hereby incorporated by reference herein for all purposes.

FIELD

The present disclosure generally relates to computer systems, and more specifically to a system and method for generating and deploying virtual replicas of real-world elements.

BACKGROUND

A virtual world is a simulated environment providing a graphical and physical representation of either a real or imaginary world, where users can interact with each other or with other elements via avatars, or virtual replicas of each other. Virtual worlds are used, for example, to create video games, to create animation in films or to train pilots in a flight simulator. In all these applications, programs are used to simulate virtual objects that interact, move, and change based on user-inputs or learned behaviors.

Objects in the virtual world may follow rules related to gravity, topography, locomotion, physics and kinematics, which may or may not be based on real-world elements. As such, current techniques exist for creating a virtual replica of a real-world item. However, these virtual replicas do not contain all the data of the real-world element and the context around them. Moreover, the replicas are typically not synchronized with their real-world counterpart to reflect changes made in the real-world. This limits the ability to employ the virtual world for significant applications such as management of the operations in buildings, factories, cities, etc.

Development, testing, and deployment of virtual replicas may be computationally intensive. Furthermore, the variable nature of digital reality environments (e.g., augmented reality, virtual reality, and merged reality) poses challenges for developers when creating virtual replicas. What is desired is a system and method to ease development, deployment, and operation of virtual replicas that can accurately mirror the real-world elements that they represent in a less computationally-intensive way, containing a high level of synchronized information from each element, and in an integrated ecosystem.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One or more drawbacks described in the background are addressed by a system and method for developing and deploying virtual replicas of real-world elements into a persistent virtual world system as disclosed herein.

In one aspect, a system for developing and deploying virtual replicas of real-world elements according to the current disclosure comprises a server system comprising one or more server computers, each server computer comprising a memory and a processor, the server system storing a persistent virtual world system comprising virtual replicas of real-world elements, the virtual replicas having self-computing capabilities, the server system further storing a replica editor configured to input explicit data and instructions to the virtual replicas, and a virtual world-based quality assurance (QA) system configured to test and validate the virtual replicas. The server system is configured to receive multi-source data from devices connected to the server system via a network, and to use the received multi-source data to synchronize and update in real-time the virtual replicas. The devices may include sensing mechanisms configured to obtain multi-source data that serve to enrich, synchronize, and update in real-time the virtual replicas. The devices may include user devices configured to provide users with access to the persistent virtual world system, replica editor, and virtual world-based QA system, or other devices configured in a plurality of areas of the real world to continuously update the persistent virtual world system with multi-source data, or a combination thereof.

The replica editor may enable the input of explicit data and instructions that relate to each digital replica, which may describe features such as the shape, location, position and orientation, physical properties, and the expected functioning and impact of each replica. The virtual replicas include data and instructions that are input through software modules and tools included in the replica editor, including modeling tools, location and space settings, physics settings, operation settings, an artificial intelligence module, a data synchronization module, and a replica testing module. These modules and tools are configured to enable a developer to seamlessly develop, configure, test, and synchronize the virtual replicas.

After developing the virtual replicas through the replica editor, the virtual replica developers may synchronize the virtual replicas with multi-source data obtained by sensing mechanisms mounted upon devices connected to the persistent virtual world system. The multi-source data enables a constant flow of data that can update in real-time the state of each virtual replica. Once the virtual replicas are synchronized, the virtual replica developer may test the synchronized virtual replicas via the virtual replica editor. The virtual replica developer may send a validation request to the persistent virtual world system administrator, which may view the request via the persistent virtual world system-based QA system. The persistent virtual world system administrator may, via the persistent virtual world system-based QA system, validate the virtual replica and, if necessary, send adjustment requests to the virtual replica editor, which may thereafter adjust the virtual replicas until they are compliant to the persistent virtual world system administrator. The persistent virtual world system administrator may thereafter deploy the virtual replicas into the persistent virtual world system, making them available for other users.

In some embodiments, the real-world element may not yet be available, such as when the real-world element does not have sensing mechanisms or has not been built or installed. In this case, the virtual replica of such real-world elements may be based on simulations performed within the persistent virtual world system.

In an embodiment, in order to reduce hardware and network demands, contribute to the reduction of network latency, and improve the general digital reality experience, the system may connect through a network including millimeter-wave (mmW) or combinations of mmW and sub 6 GHz communication systems, such as through $5^{th}$ generation wireless systems communication (5G). In other embodiments, the system may connect through wireless local area networking (Wi-Fi), which may, for example, provide data at 60 GHz. Provided communication systems may allow for low (e.g., about 1 to about 5 millisecond) end-to-end (E2E) latency and high (e.g., 1-10 Gbps) downlink speeds to end points in the field, complying with parameters necessary for executing the typically highly-interactive digital reality applications. This results in high-quality, low latency, real-time digital application content streaming. In other embodiments, the system may communicatively connect through 4th generation wireless systems communication (4G), may be supported by 4G communication systems, or may include other wired or wireless communication systems.

According to an embodiment, the sensing mechanisms mounted on the user devices include a combination of inertial tracking sensing mechanisms and transceivers. The inertial tracking sensing mechanisms can make use of devices such as accelerometers and gyroscopes, which may be integrated in an inertial measuring unit (IMU). The transceivers may be implemented to send and receive radio communication signals to and from antennas. In an embodiment, the transceivers are mmW transceivers. In embodiments where mmW antennas are employed, the mmW transceivers are configured to receive mmW signals from the antennas and to send the data back to the antennas. The inertial sensors, and positional tracking provided by mmW transceivers and the accurate tracking, low-latency and high quality of service (QOS) functionalities provided by mmW-based antennas may enable sub-centimeter or even sub-millimeter positional and orientational tracking, which may increase accuracy when tracking the real-time position and orientation of the client elements. In some embodiments, tracking may be implemented by employing several techniques known in the art, such as time of arrival (TOA), angle of arrival (AOA), or other tracking techniques known in the art (e.g., visual imaging, radar technology, etc.). In alternative embodiments, the sensing mechanisms and transceivers may be coupled together in a single tracking module device.

Providing an accurate tracking of the connected elements may be useful for displaying a reliable status of virtual replicas within the persistent virtual world system, in particular their position and orientation, which may be relevant for various applications. In addition, enabling an accurate, real-time tracking of connected elements may reduce the need to physically sense other connected devices, as the real device can use its virtual replica to sense the reality through the virtual world.

In another aspect, a method performed by a server system comprises providing a persistent virtual world system comprising virtual replicas of real-world elements, the virtual replicas having self-computing capabilities, a replica editor configured to input explicit data and instructions to the virtual replicas, and a virtual world-based quality assurance system configured to test and validate the virtual replicas; receiving, from devices connected to the server system, multi-source data; and using the received multi-source data to synchronize and update in real-time the virtual replicas.

According to an embodiment, a method for developing and deploying virtual replicas into a persistent virtual world system is provided. The method may be implemented in a system of the current disclosure. The method may comprise developing, by a virtual replica developer via a replica editor hosted and computed on a server and accessed by a user device connected to the server via a network, a virtual replica of a corresponding real element, each virtual replica comprising data and instructions enabling self-computing capabilities by each replica. The method continues by the virtual replica developer synchronizing, via multi-source data received by sensing mechanisms mounted on a plurality of devices, the virtual replicas with corresponding real-world elements. Then the method continues by testing, by the virtual replica developer via the virtual replica editor, the synchronized virtual replicas. If the virtual replica is approved by the virtual replica developer, he or she may send a validation request to a persistent virtual world system administrator. The method continues by validating, by the persistent virtual world system administrator, the virtual replica via a virtual world-based quality assurance system. If the virtual replica is not compliant, the method continues by sending, by the persistent virtual world system administrator, application adjustment requests to the virtual replica developer. The method continues by adjusting, by the virtual replica developer, the virtual replica via the replica editor. Finally, if the virtual replica is compliant, the persistent virtual world system administrator may deploy via the virtual world-based quality assurance system the virtual replica into a deployed persistent virtual world system.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have advantages not specifically recited in the above summary. Other features and advantages will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1:
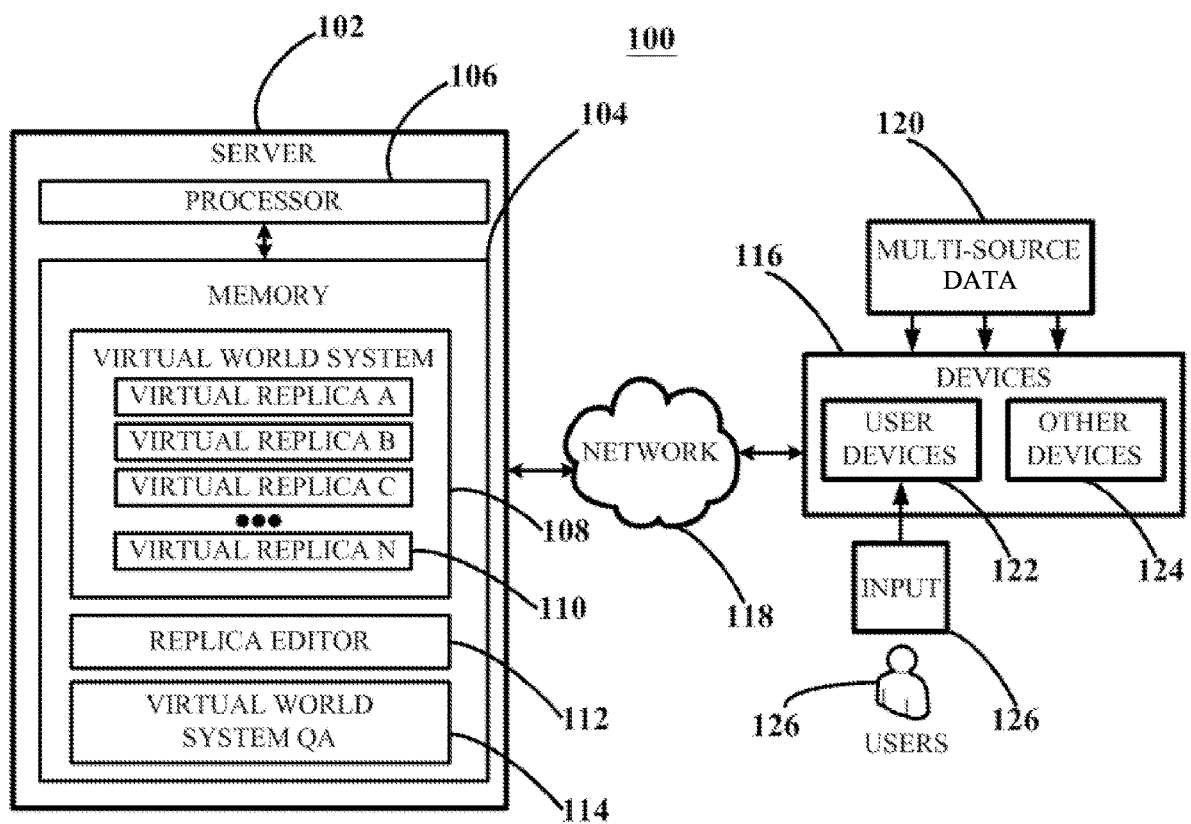
FIG. 1 depicts a diagram of a system for developing, testing, and deploying a virtual replica of a real-world element into a persistent virtual world system, according to an embodiment.

FIG. 1 depicts a diagram of a system 100 for developing, testing, and deploying a virtual replica of a real-world element into a persistent virtual world system, according to an embodiment. The system 100 includes a server 102 configured to store and process input data and instructions, the server 102 further including a memory 104 and a processor 106. The memory 104 stores a persistent virtual world system 108 comprising virtual replicas 110 of real-world elements having self-computing capabilities, a replica editor 112 configured to input explicit data and instructions to each virtual replica, and a virtual world-based quality assurance (QA) system 114 configured to test and validate the virtual replicas 110. The processor 106 is configured to execute instructions on data stored in the memory 104. The system 100 further comprises one or more devices 116 connected to the server 102 via a network 118. The devices 116 comprise sensing mechanisms configured to obtain multi-source data 120 that serve to synchronize and update the virtual replicas 110. Each device 116 may obtain data from one or more sources (e.g., from one or more real-world elements, environmental sensors, computing devices, etc.). Collectively, the devices 116 obtain data from multiple sources. As used herein, the term "multi-source data" refers to data that may be obtained from multiple sources. The devices 116 may include user devices 122 configured to access the persistent virtual world system 108, replica editor 112, and virtual world-based QA system 114, and other devices 124 configured in a plurality of areas of the real world to continuously update the persistent virtual world system 108 via the multi-source data 120.

The user devices 122 may be, for example, mobile devices, personal computers, game consoles, media centers, smart contact lenses, and head-mounted displays. The other devices 124 may refer to any computing device or machine that can be connected to a network, can communicate with each other, and which receives information from a plurality of sources, a technological concept known nowadays as the Internet of Things (IoT), and such devices can be referred to as IoT devices. The virtual replicas 110 may represent devices 116 connected to the persistent virtual world system 108 (e.g., user devices 122 and other devices 124) and also unconnected elements. Unconnected elements refer to elements that only provide the respective real appearance and other characteristics (e.g., physics) of the corresponding real-world element, as they do not comprise sensing mechanisms. These unconnected elements may be, for example, topographical and other naturally-occurring elements, such as trees, mountains, terrains, the sky, and the like, that have been modeled and simulated according to their visual appearance and physics but which may not contain sensors to capture real-time data from them. The term "instructions," as used herein, refers to code (e.g., binary code) that is configured to be executed by a processor. In the context of a virtual replica, instructions may refer to code that represents the appearance and behavior of the real-world element. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages.

The explicit data may include data that may not be obtained by the sensing mechanisms but which instead may need to be input digitally through the replica editor 112, such as priority data, building materials, wall thicknesses, electric installations and circuitry, water pipes, fire extinguishers, emergency exits, window locations, machine performance parameters, machine sensor and valve locations, etc. The explicit data and instructions input through the replica editor 112 may include, apart from the shape, physics, and other properties of a real-world element, descriptive data and instructions that detail the expected functioning and behavior of the real-world element, including, for example, expected electricity and water consumption, expected flow of people in a building, and expected carbon footprint of a facility.

"Priority data," as used herein, refers to a hierarchical classification of real-world elements according to their relative importance for the real world system 108. For example, certain vehicles (e.g., ambulances) or people (e.g., presidents, government officials, police officers, etc.) may have higher priorities which may affect the decisions performed based on data inference.

The term "real world element," as used in the current disclosure, refers to elements found in the real world which may be sensed by sensing mechanisms. For example, the real-world elements may be moving or static entities found in the real world, including human beings, vehicles, buildings, objects, recreation areas, natural formations, and streets, amongst others.

In the current disclosure, the term "persistent" is used to characterize a state of a system that can continue to exist without a continuously executing process or network connection. For example, the term "persistent" may be used to characterize the virtual world system where the virtual world system and all of the virtual replicas, purely virtual objects and applications therein comprised continue to exist after the processes used for creating the virtual replicas, purely virtual objects and applications cease, and independent of users being connected to the virtual world system. Thus, the virtual world system is saved in a non-volatile storage location, e.g., in a server. In this way, virtual replicas, purely virtual objects and applications may interact and collaborate with each other when being configured for accomplishing specific goals even if users are not connected to the server.

As explained above, virtual replicas may be updated based on multi-source data, such as by updating known parameters or features, by enriching the virtual replicas with additional parameters or features, or the like. In the current disclosure, the term "enriching" is used to describe the act of providing further properties to a virtual replica based on the multi-source data 120. Enriching a virtual replica may be considered a special form of updating the virtual replica with one or more new forms of data that may not have been previously present in the virtual replica. For example, enriching the virtual replicas may refer to providing real-world data captured from sensing mechanisms on the plurality of devices 116, wherein the further real-world data comprises video data, temperature data, real-time energy consumption data, real-time water consumption data, speed or acceleration data, and the like.

"Self-computing capabilities," also referred to as "self-managing capabilities" refers herein to the ability of a virtual replica of the persistent virtual world system to apply artificial intelligence algorithms in order to autonomously manage computing resources (e.g., distributed computing resources). In an embodiment, virtual replicas with self-computing capabilities are able to autonomously manage computing resources to adapt to changes in the environment of corresponding real-world elements or in the real-world elements themselves. Thus, in an embodiment, each virtual replica may act autonomously depending on the conditions in the real world reflected in the persistent virtual world system, e.g., by allocating required resources, autonomously sending and executing commands and generating events as may be required by each circumstance. Achieving this type of behavior may require training the virtual replicas with artificial intelligence algorithms during the modeling of the virtual replicas. Thus, the role of a virtual replica editor may be limited to defining general policies and rules that guide the self-management process. For example, in the case of a car accident, the virtual replicas of autonomous vehicles close to the accident may decide to lower their speed or come to a stop in order to worsen traffic conditions, and notify the relevant authorities, before the passengers in the vehicles close to the accident can even know that there was an accident.

A pair of virtual-real twin, or twin-pair, comprises a real world element and its corresponding virtual replica, or virtual twin, and can be considered as a Cyber-physical system or CPS. The CPS is an integration of computation with physical processes whose behavior is defined by both cyber and physical parts of the system. Therefore, a virtual replica is the cyber part of the CPS, while the physical part is the real world element. The virtual replica 110 may then be considered as an extension of the real twin that allows connecting the physical part with artificial intelligence and simulations to improve the object's capabilities and performance. The virtual replica 110 may, in some embodiments, be a substitute of part of the physical components and processes. For example, in cases when a sensor is failing in the real counterpart the sensing inputs for the real twin are provided by the interactions of the virtual twin in the virtual world. In another example, part of the computation for the real twin may be performed in the virtual world through the virtual replica 110 if the battery is running low in the real twin.

Virtualization of real-world elements and adding respective data and instructions of each real-world element into the virtual replica 110 enables self-computing capabilities and autonomous simulations of each virtual replica 110 and of the whole persistent virtual world system 108. Depending on the level of complexity of the virtualization of real-world elements, the 3D computations may range from simple 3D computations to more advanced ones. For example, an object that has been virtualized to include only some properties, such as geometric and 3D models but not including an artificial intelligence model, may limit the computations and thus the applications for which the virtual replica 110 may be used. Thus, an accurate 3D mapping that also comprises complex models is necessary to enable higher quality simulations and augmenting reality in diverse ways for a plurality of applications.

In some embodiments, the real-world element may not yet be available, such as when not yet comprising sensing mechanisms or not being yet built or installed. In this case, the virtual replica of such real-world elements may be based on simulations performed within the persistent virtual world system.

By way of example, a virtual replica 110 of an elevator (e.g., virtual replica A) may include data and instructions representing the geometry, materials, physics, along with the mechanics and functioning of the real elevator as part of a real building (e.g., virtual replica B). The functioning, such as the movement from one floor level (e.g., virtual replica C) to another, may be updated in real time in the persistent virtual world system 108 as the elevator moves in real life. Likewise, the elevator may be indirectly manipulated in real life by manipulating the virtual replica 110.

According to an embodiment, antennas (not shown) may be configured to transmit and receive radio waves that enable mobile communication to the system 100. Antennas may be connected through wired or wireless means to computing centers or data centers where the servers may be located. In other embodiments, the antennas are provided within the computing centers and/or areas serviced by computing centers. In some embodiments, in order to provide connection to computing devices located outdoors, the antennas may include millimeter wave (mmW)-based antenna systems or a combination of mmW-based antennas and sub 6 GHz antenna systems, such as $5^{th}$ generation wireless systems communication networks (5G). In other embodiments, the antennas may include other types of antennas, such as 4G antennas, which may be used as support antennas for the mmW/sub GHz antenna systems. In embodiments where antennas are used for providing connection to computing devices located indoors, the antennas may use wireless local area networking (WiFi), preferably, but not limited to, providing data at 60 GHz.

In other embodiments, global navigation satellite systems (GNSS), which refers generally to any satellite-based navigation systems like GPS, BDS, Glonass, QZSS, Galileo, and IRNSS, may be used for enabling positioning of devices. Employing signals from a sufficient number of satellites and techniques such as triangulation and trilateration, GNSS can calculate the position, velocity, altitude, and time of devices. In an embodiment, the external positioning system is augmented by assisted GNSS (AGNSS) through the architecture of existing cellular communications network, wherein the existing architecture comprises 5G. In other embodiments, the AGNSS tracking system is further supported by a 4G cellular communications network. In indoor embodiments, the GNSS is further augmented via radio wireless local area networks such as Wi-Fi, preferably, but not limited to, providing data at 60 GHz. In alternative embodiments, the GNSS is augmented via other techniques known in the art, such as via differential GPS (DGPS), satellite-based augmentation systems (SBASs), real-time kinematic (RTK) systems. In some embodiments, tracking of devices is implemented by a combination of AGNSS and inertial sensors in the devices.

In some embodiments of the current disclosure, the system 100 may be implemented in a cloud to edge infrastructure that may display distributed computing capabilities employing public or private clouds, fog servers, and edge devices and systems, such as enterprise systems, mobile platforms, and user devices, all of which may connect through a network. Using a cloud to edge computing network, access to computing power, computer infrastructure (e.g., through so-called infrastructure as a service, or IaaS), applications, and business processes can be delivered as a service to users via client devices on demand. This way, resources including physical servers and network equipment enable a shared storage and computing that may be dynamically allocated depending on factors such as the distance of the user to the resources and the network and computational demand from the users.

According to an embodiment, users 126 can visit access the persistent virtual world system 108 in any of augmented reality, virtual reality or mixed reality to interact with other users or with virtual objects such as virtual replicas 110, applications, ads, and the like. Thus, for example, a user 126 can visit a remote location of the real world by selecting the place in virtual reality, enabling other users in the area to view a virtual avatar of the user in the desired location and to interact with the user.

By way of example, a deployed virtual replica 110 in a persistent virtual world system 108 may be accessed, monitored, manipulated, and managed by users such as home owners, factory managers, and city government officials through suitable user devices 122. The reach and scope of the management by each persistent virtual world system user 126 may depend upon user permissions that may need to be provided by a persistent virtual world system administrator. For example, a home owner using the persistent virtual world system 108 may be limited to managing virtual replicas 110 in his home; a factory manager may be entitled only to manage virtual replicas 110 inside of his factory; and a government official may be entitled to access, view, and manage all or most virtual replicas 110 in the persistent virtual world system 108.

Figure 2:
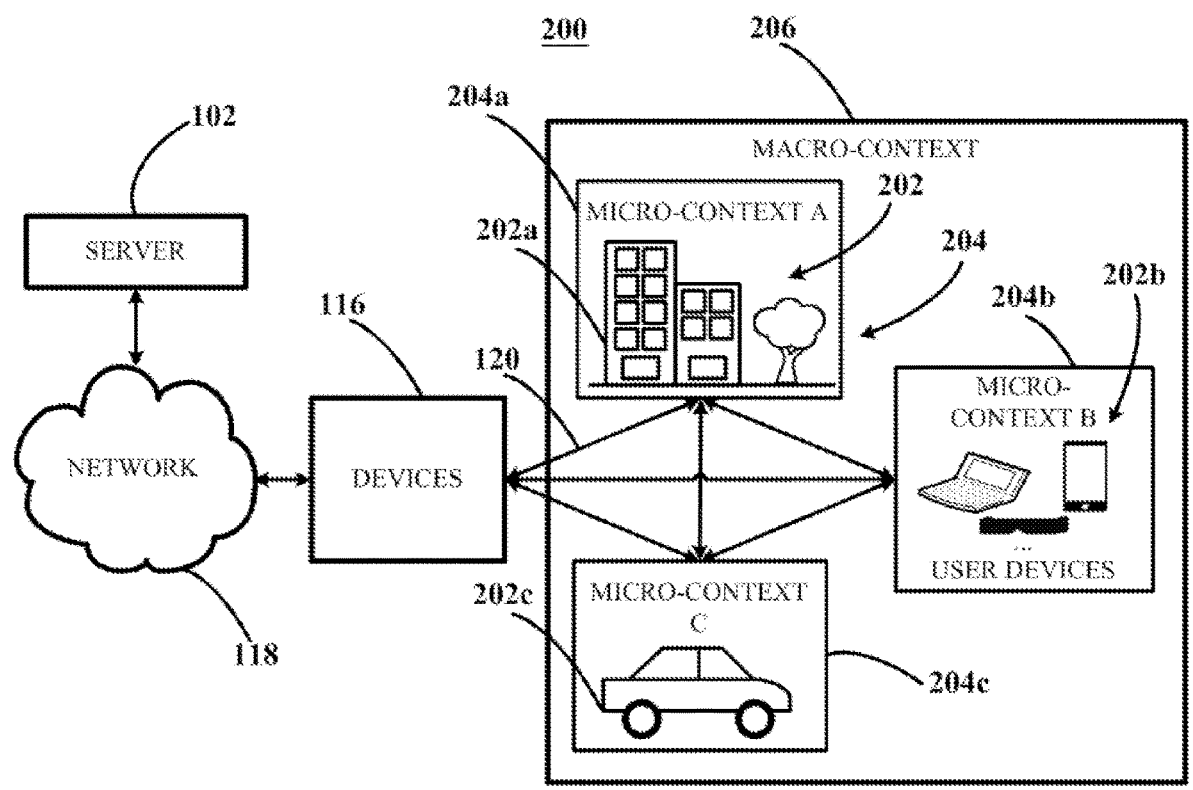
FIG. 2 depicts a diagram of a system for developing, testing, and deploying a virtual replica of a real-world element into a persistent virtual world system, detailing the capture of multi-source data and sharing the data with a server, according to an embodiment.

FIG. 2 depicts a diagram of a system 200 for developing, testing, and deploying a virtual replica of a real-world element into a persistent virtual world system, detailing the capture of multi-source data and sharing the data with a server 102, according to an embodiment. Some elements of FIG. 2 may be similar to elements of FIG. 1, and thus similar or identical reference numerals may be used to identify those elements.

As viewed in FIG. 2, the system 200 comprises devices 116 comprising sensing mechanisms mounted upon them and configured to capture multi-source data 120 that serve to enrich the virtual replicas. The devices 116 connect to the server 102 via the network 118. The multi-source data 120 includes capturable data of real-world elements 202, comprising one or more of 3D image data, 3D geometries, 3D entities, 3D dynamic objects, video data, audio data, priority data, chemical composition, waste production data, textual data, time data, positional data, orientational data, velocity data, temperature data, humidity data, pollution data, lighting data, volume data, flow data, chromatic data, power consumption data, bandwidth data, and mass data, amongst others.

The multi-source data 120 includes contextual data, which may be classified into micro-context 204 immediately affecting a real-world element, and macro-context 206 derived from a plurality of micro-contexts 204. The term "context" or "contextual data", as used in the current disclosure, refers to data related to the direct or indirect environment of a specific real-world element. The term "micro-context" refers to the context immediately surrounding a real-world element, such as people, objects, or conditions that may directly affect the real-world element. Micro-context may include data such as 3D image data, 3D geometries, 3D entities, 3D dynamic objects, video data, audio data, textual data, time data, metadata, security data, positional data, lighting data, temperature data, and quality of service (QOS), amongst others, of the environment immediately surrounding and affecting each real-world element 202.

The term "macro-context" refers to the indirect or more distant context surrounding a real world element. The macro context 204 may be derived by the server from a plurality of micro-contexts 206, giving rise to more holistic information of a system, such as the current efficiency of a manufacturing plant, air quality, climate change levels, company efficiency, city efficiency, country efficiency, etc. The macro context 206 may be considered and computed at different levels depending on the specified goals.

The multi-source data 120 serves additionally to synchronize the virtual replicas 110 with the corresponding real-world elements 202. The sensing mechanisms include one or more temperature sensors, proximity sensors, inertial sensors, infrared sensors, pollution sensors (e.g., gas sensors), pressure sensors, light sensors, ultrasonic sensors, smoke sensors, touch sensors, chromatic sensors, humidity sensors, water sensors, electrical sensors, or combinations thereof. By providing a plurality of devices 116 with sensing mechanisms constantly capturing data from the real world, the virtual world stored in the server 102 and each of the virtual replicas 110 are kept updated with real-time, multi-source data 120 that mirror the conditions of the real world.

In the illustration of FIG. 2, the multi-source data 120 includes data captured by sensing mechanisms mounted on devices 116 that may be part of buildings 202a, user devices 202b, and vehicles 202c, each updating their respective micro-contexts 204 (e.g, micro-contexts 204a-c) that in turn is used to compute and infer a macro-context 206. For example, a vehicle 202c connected to the server 102 via network 118 may include sensing mechanisms such as speed sensors, tracking modules, and cameras, all of which provide multi-source data 120 that may be captured and sent to the server 102. The micro-context 204c may include elements or conditions of the environment around the vehicle 202c. In another example, a building 202a may include several devices comprising sensing mechanisms providing multi-source data 120 representing the operation of the building 202a, including energy consumption, water usage, utilized space, temperature, resource utilization efficiency, carbon footprint, tracking of all devices within the building 202a, and images representing the micro-context 204a within and near the building 202a. In another example, user devices 202b include sensing mechanisms (e.g., cameras and microphones) that capture multi-source data 118 of the area surrounding the user devices 202b, thus updating the respective micro-context 204b. The data captured by the sensing mechanisms of the user devices 202b may also update a virtual avatar of a respective user available in the persistent virtual world system, such as updating the user location or actions being performed at that time.

Figure 3:
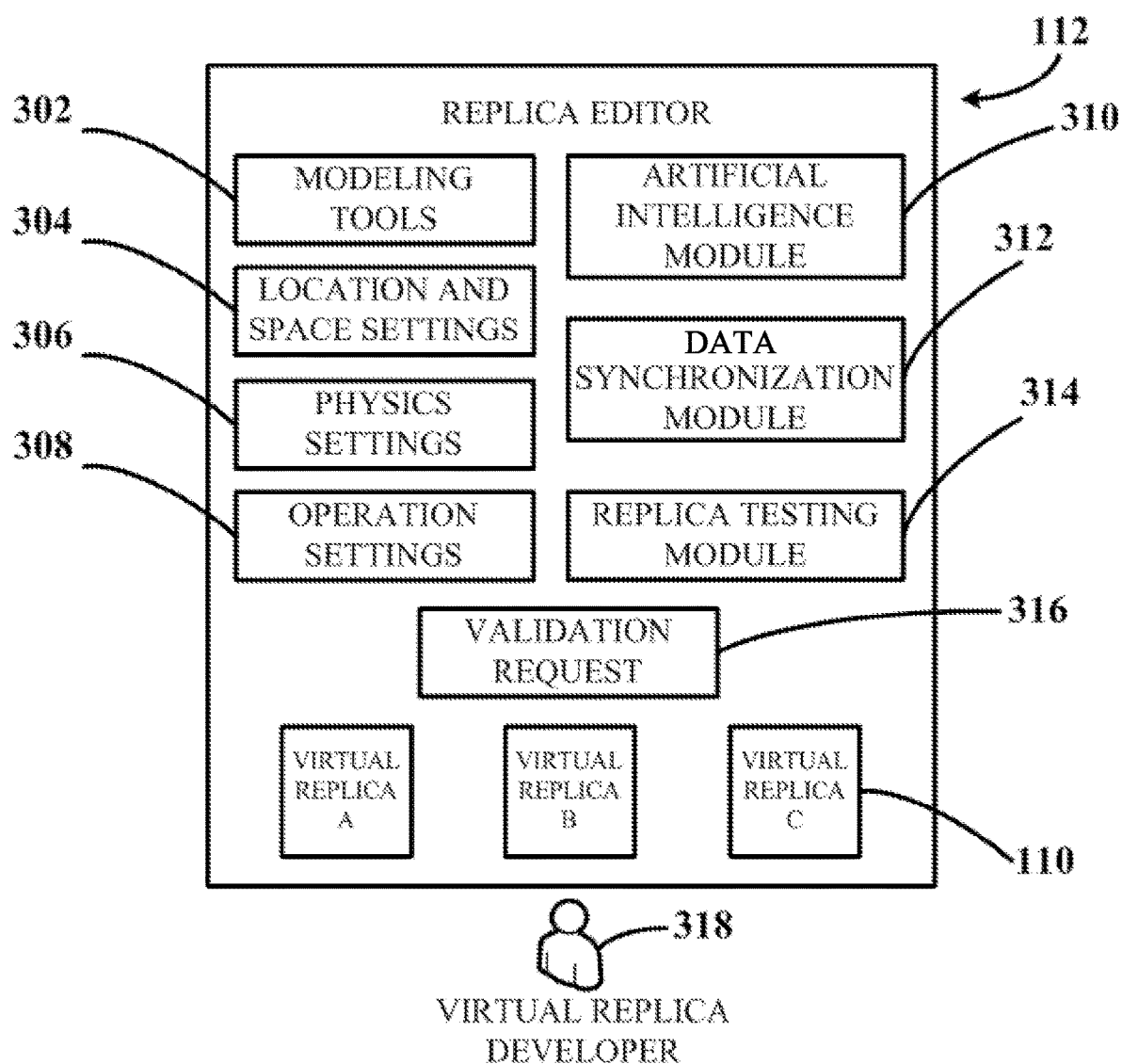
FIG. 3 depicts a diagram of a system for developing, testing, and deploying a virtual replica of a real-world element into a persistent virtual world system, detailing components of a replica editor, according to an embodiment.

FIG. 3 depicts a diagram of a replica editor 112, according to an embodiment. Each of the components and modules of system 300 includes instructions with code that are part of programs configured to provide different functionalities. The replica editor 112 may include modeling tools 302, location and space settings 304, physics settings 306, operation settings 308, an artificial intelligence module 310, a data synchronization module 312, a replica testing module 314, and a validation request module 316. Each of the developed virtual replicas 110 may be viewed and edited within the replica editor 112 by one or more replica developers 318.

The replica editor 112 may be, for example, a computer-aided drawing (CAD) or computer-aided engineering (CAE) software that may store explicit data and instructions necessary to input and edit virtual replicas 110. The replica editor 112 may enable the input of explicit data and instructions that relate to each virtual replica 110, which describe the shape, location, position and orientation, physical properties, and the expected functioning and impact of each virtual replica 110. Modeling tools 302 may enable replica developers 318 to build the virtual replicas 110, and may include all kind of development tools as, for example, 3D game engine software development kits. The modeling tools 302 may further enable inputting readily-available CAD and CAE models of the real-world elements. For example, machine owners may provide already-existing digital CAD and CAE models of their machines. Similarly, building owners may provide building information models (BIMs), which are digital representation of physical and functional characteristics of a facility, and store them in the persistent virtual world system 108. In other embodiments, the modeling tools 302 enable a car or drone-based image-scanning pipeline to be input through a variety of photo, video, depth measurements, and/or simultaneous location and mapping (SLAM) scanning in order to model the virtual replicas 110. In other embodiments, radar-imaging, such as synthetic-aperture radars, real-aperture radars, Light Detection and Ranging (LIDAR), inverse aperture radars, monopulse radars, and other types of imaging techniques may be used to map and model real-world elements before integrating them into the persistent virtual world system. Radar-imaging solutions may be performed especially in cases where the original models of the structures are not available, or in cases where there is missing information or there is a need to add additional information to the virtual world entities which is not provided by the CAD or CAE models.

In some embodiments, a virtual replica 110 includes one or more of 3D world and building data, such as SLAM or derivate-mapping based data; 3D geometry data; 3D point cloud data; or geographic information system data representing real-world structural properties that may serve to model a 3D structure for digital reality applications.

In some embodiments, each of the virtual replicas may be geolocated using a reference coordinate system suitable for use with current geolocation technologies. For example, the virtual replicas may use a World Geodetic System standard such as WGS84, which is the current reference coordinate system used by GPS.

In the current disclosure, the term "impact" refers to the short or long-term effect of each virtual replica or to a group of virtual replicas to the macro-context. For example, one or more virtual replicas may have an effect in the overall efficiency of a manufacturing plant, in the air quality, climate change levels, company efficiency, resource consumption (e.g., water or electricity consumption), and the like. When developing virtual replicas of real world elements, virtual replica developers should define the properties and behavior of the virtual replicas in order to minimize negative impact to the environment, which may involve maximizing resource usage efficiency and ensuring process optimization of each virtual replica or group of virtual replicas. For example, when modeling one or more virtual replicas of manufacturing robots in a manufacturing plant, each virtual replica should be aware of a desired overall plant efficiency so that the production speed and resource consumption of each virtual replica in order to meet that goal. Another impact-related goal may be, for example, keeping the lowest carbon footprint possible, which can be achieved by optimizing the energy consumption during the production process of the virtual twins. The actions of the virtual replicas are thus translated in corresponding actions of the real twins, resulting in a real-world optimization and thus a minimized negative impact of each real twin.

The location and space settings 304 are configured to allow setting up the location and space where virtual replicas are available, the relative three-dimensional position and orientation, and scaling of virtual replicas 110. The physics settings 306 are configured to enable the specification of physical properties of the virtual replicas 110, such as rigid body dynamics, soft body physics, fluid dynamics, and collision detection, amongst others. The operation settings 308 are configured to enable the specification of the expected functioning and impact of the virtual replicas 110, such as the expected behavior of a determined virtual replica 110. For example, the operation settings 308 may configure the operation of a production machine, specifying which movements and actions to take depending on specific conditions. The artificial intelligence module 310 enables performing machine learning and inference for artificial intelligence applications that can be employed as solutions to manage and optimize real-world elements through the processing of their respective virtual replicas 110. The data synchronization module 312 is configured to receive and process multi-source data captured by sensing mechanisms of the devices in order to synchronize the virtual replicas 110 with the corresponding real-world elements.

The replica editor 112 further comprises a replica testing module 314 that enables testing the virtual replicas 110, which can be performed at any time of the virtual replica development. Tests may be performed in order to validate the real-world position and orientation along with the functioning and behavior of the virtual replicas 110 with respect to the corresponding real-world elements.

After the virtual replicas 110 are developed and synchronized, the virtual replica developers 318 may proceed to request persistent virtual world system administrators via the validation request module 316 for approval to deploy the virtual replicas 110 into the persistent virtual world system.

Figure 4:
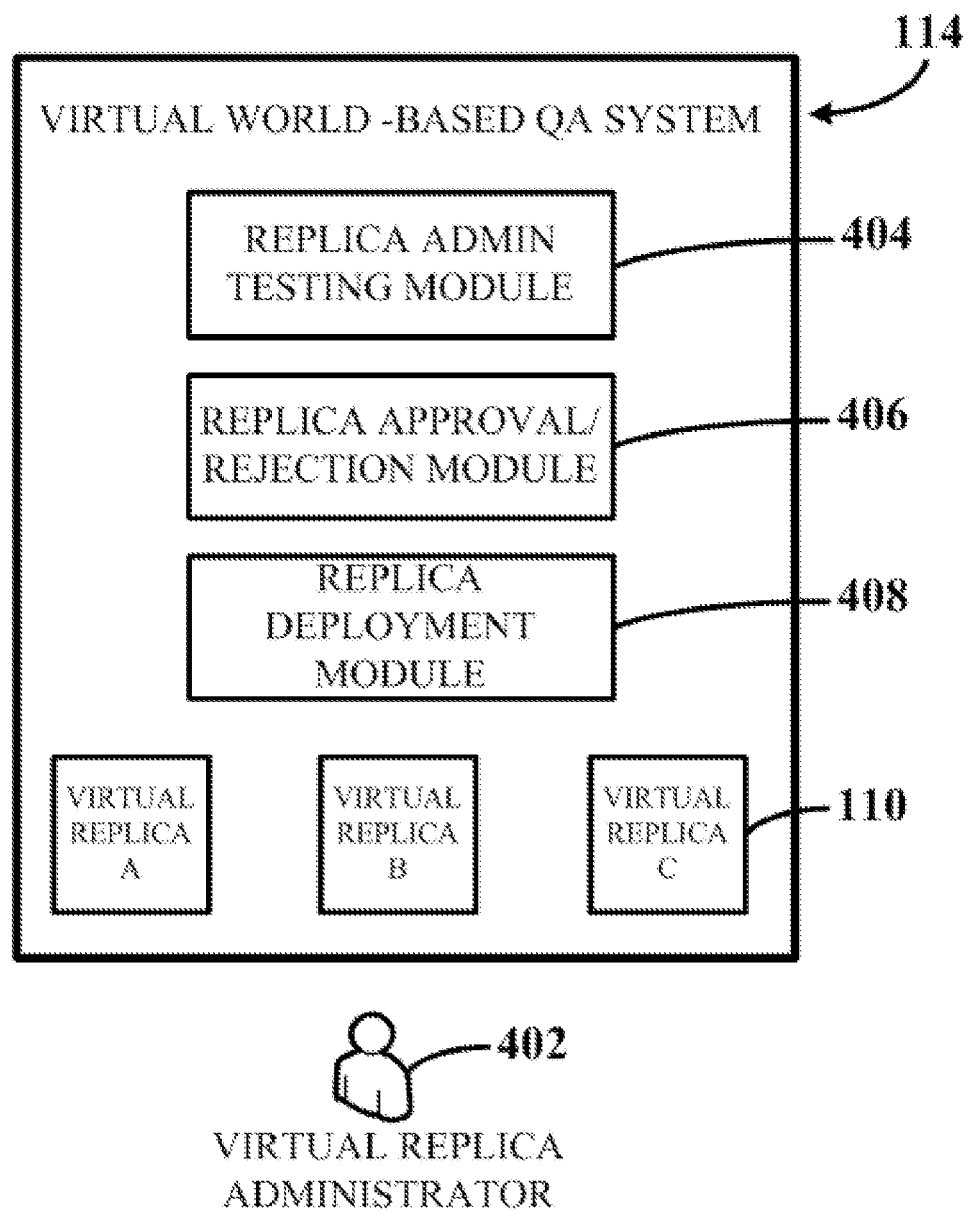
FIG. 4 depicts a diagram of a system for developing, testing, and deploying a virtual replica of a real-world element into a persistent virtual world system, detailing components of a virtual world based quality assurance system, according to an embodiment.

FIG. 4 depicts a diagram of a virtual world-based-QA system 114, according to an embodiment. Some elements of FIG. 4 may be similar to elements of FIGS. 1-3, and thus similar or identical reference numerals may be used to identify those elements. The virtual world-based QA system 114 may be used by persistent virtual world system administrators 402 to test virtual replicas 110 that have been developed through the replica editor, to enable sending, if necessary, adjustment requests to the virtual replica developers, and to deploy the virtual replicas 110, if compliant, into the persistent virtual world system.

The virtual replicas 110 that are ready for compliance checking may be tested via a replica admin testing module 404 in order to determine whether to approve or reject the virtual replicas 110. Through the virtual world-based QA system 114, the persistent virtual world system administrator 402 may test the virtual replica and provide, whenever necessary, replica adjustment requests to the virtual replica developer. The replica developer may then proceed to perform further adjustments on the virtual replicas in order to comply with the requests from the persistent virtual world system administrator 402. The persistent virtual world system administrator 402 may approve or reject the virtual replicas 110 via the replica approval/rejection module 406. Once the virtual replica 110 is compliant with the requests, the persistent virtual world system administrator 402 may deploy the virtual replica into the persistent virtual world system via the replica deployment module 408.

Figure 5:
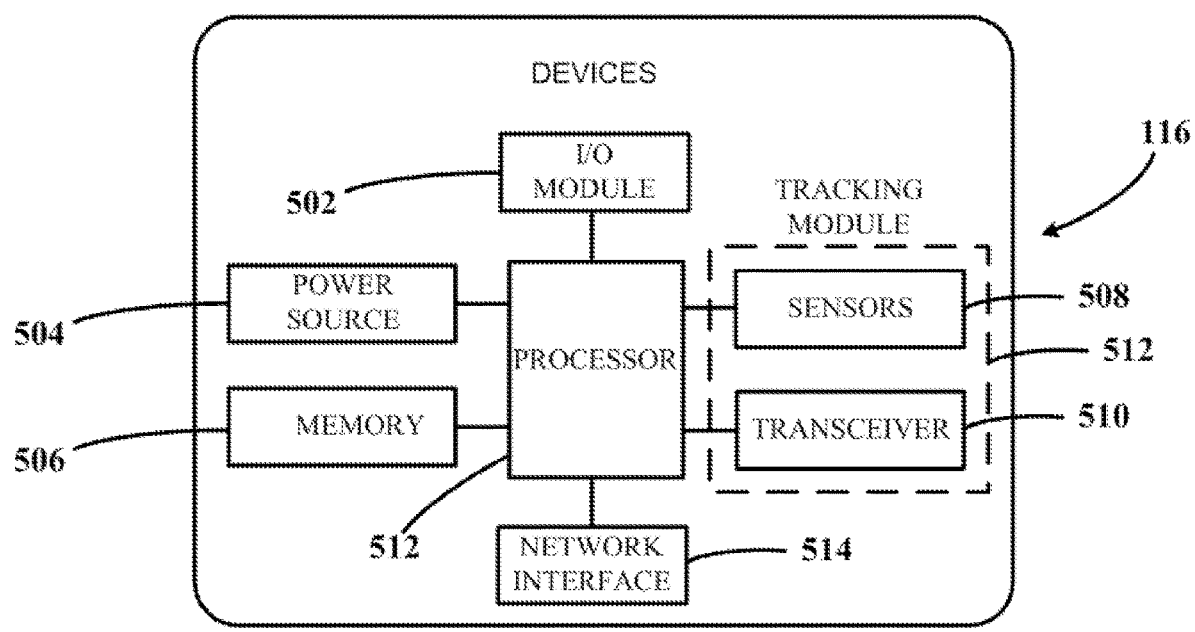
FIG. 5 depicts a diagram of a system for developing, testing, and deploying a virtual replica of a real-world element into a persistent virtual world system, detailing operational components of devices, according to an embodiment.

FIG. 5 depicts a schematic illustration of device 116. Devices 116 may include user devices 122 and other devices 124, as described with reference to FIG. 1.

A device 116 may include operational components such as an input/output (I/O) module 502; a power source 504; a memory 506; sensing mechanisms 508 and transceivers 510 forming a tracking module 512; and communication circuitry such as a network interface 514, all operatively connected to a processor 516.

The I/O module 502 is implemented as computing hardware and software configured to interact with users and provide user input data to one or more other system components. For example, I/O module 502 may be configured to interact with users, generate user input data based on the interaction, and provide the user input data to the processor 516 before being transferred to other processing systems via a network, such as to a server. In another example, I/O modules 502 is implemented as an external computing pointing device (e.g., a touch screen, mouse, 3D control, joystick, gamepad, and the like) and/or text entry device (e.g., a keyboard, dictation tool, and the like) configured to interact with other connected elements. In yet other embodiments, I/O module 502 may provide additional, fewer, or different functionality to that described above.

The power source 504 is implemented as computing hardware and software configured to provide power to the device 116. In one embodiment, the power source 504 may be a battery. The power source 504 may be built into the devices or removable from the devices and may be rechargeable or non-rechargeable. In one embodiment, the devices may be repowered by replacing one power source 504 with another power source 504. In another embodiment, the power source 504 may be recharged by a cable attached to a charging source, such as a universal serial bus ("USB") FireWire, Ethernet, Thunderbolt, or headphone cable, attached to a personal computer. In yet another embodiment, the power source 504 may be recharged by inductive charging, wherein an electromagnetic field is used to transfer energy from an inductive charger to the power source 504 when the two are brought in close proximity but need not be plugged into one another via a cable. In another embodiment, a docking station may be used to facilitate charging.

The memory 506 may be implemented as computing hardware and software adapted to store application program instructions and to store multi-source data captured by the sensing mechanisms. The memory 506 may be of any suitable type capable of storing information accessible by the processor 516, including a computer-readable medium, or other medium that stores data that may be read with the aid of an electronic device, such as a hard-drive, memory card, flash drive, ROM, RAM, DVD or other optical disks, as well as other write-capable and read-only memories. The memory 506 may include temporary storage in addition to persistent storage.

The sensing mechanisms may be implemented as computing hardware and software adapted to obtain multi-source data from the real world and determine/track the position and orientation of the device 116 and, therefore, of the one or more real-world elements to which the device 116 may be linked. The sensing mechanisms may include, without limitations, one or more include one or more temperature sensors, proximity sensors, inertial sensors, infrared sensors, pollution sensors (e.g., gas sensors), pressure sensors, light sensors, ultrasonic sensors, smoke sensors, touch sensors, chromatic sensors, humidity sensors, water sensors, electrical sensors, or combinations thereof. In particular, the sensing mechanisms include one or more Inertia Measuring Units (IMUs), accelerometers, and gyroscopes. The IMU is configured to measure and report the velocity, acceleration, angular momentum, speed of translation, speed of rotation, and other telemetry metadata of device 116 by using a combination of accelerometers and gyroscopes. Accelerometers within the IMU and/or configured separate from the IMU may be configured to measure the acceleration of the interaction device, including the acceleration due to the Earth's gravitational field. In one embodiment, accelerometers include a tri-axial accelerometer that is capable of measuring acceleration in three orthogonal directions.

The transceivers 510 may be implemented as computing hardware and software configured to enable devices to receive wireless radio waves from antennas and to send the data back to the antennas. In some embodiments, mmW transceivers 510 may be employed, which may be configured to receive mmW wave signals from antennas and to send the data back to antennas when interacting with immersive content. The transceiver 510 may be a two-way communication transceiver 510.

According to an embodiment, the transceivers 510 enable direct communication between computing devices via a distributed ledger-based communications pipeline connected to a network. The distributed ledger-based communications pipeline may enable direct communication between device 116 through a decentralized network by allowing storage of information in a secure and accurate manner using cryptography, employing cryptographic "keys" and cryptographic signatures. Situations that may require direct communication between devices 116, and thus by-passing processing by a server, may include urgent situations in which decisions may need to be taken within a very short period of time. For example, in an autonomous driving case where two vehicles may be about to collide, it may be desired to enable a direct communication between both vehicles to generate a faster response that may prevent a collision. In other embodiments, the distributed ledger may also be utilized between server and device 116, where the server may take the authority to validate data before distributing it to each device 116. In further embodiments, the distributed ledger can make use of certain device 116 closer to servers, to antennas, or both, in order to assign these device 116 as central structures to validate and distribute data.

In an embodiment, the tracking module 512 may be implemented by combining the capabilities of the IMU, accelerometers, and gyroscopes with the positional tracking provided by the transceivers 510 and the accurate tracking, low-latency and high QoS functionalities provided by mmW-based antennas may enable sub-centimeter or sub-millimeter positional and orientational tracking, which may increase accuracy when tracking the real-time position and orientation of device 116. In alternative embodiments, the sensing mechanisms and transceivers 510 may be coupled together in a single tracking module device.

The network interface 514 may be implemented as computing software and hardware to communicatively connect to a network, receive computer readable program instructions from the network sent by the server or by other devices, and forward the instructions for storage in the memory 506 for execution by the processor 516.

The processor 516 may be implemented as computing hardware and software configured to receive and process instructions. For example, the processor 516 may be configured to provide imaging requests, receive imaging data, process imaging data into environment or other data, process user input data and/or imaging data to generate user interaction data, perform edge-based (on-device) machine learning training and inference, provide server requests, receive server responses, and/or provide user interaction data, environment data, and content object data to one or more other system components. For example, the processor 516 may receive user input data from I/O module 502 and may respectively implement application programs stored in the memory 506. In other examples, the processor 516 may receive multi-source data from sensing mechanisms captured from the real world, or may receive an accurate position and orientation of device 116 through the tracking module 512, and may prepare some of the data before sending the data to a server for further processing. The on-device processor 516 may share some of the processing tasks performed by the server. For example, one of the "other devices" (e.g. an IoT device) comprising one or more sensing mechanisms may, through the processor 512, process some of the multi-source data sent by the sensing mechanisms, update the state of the device, and send this data to the server for updating the state of the corresponding virtual replica.

Figure 6:
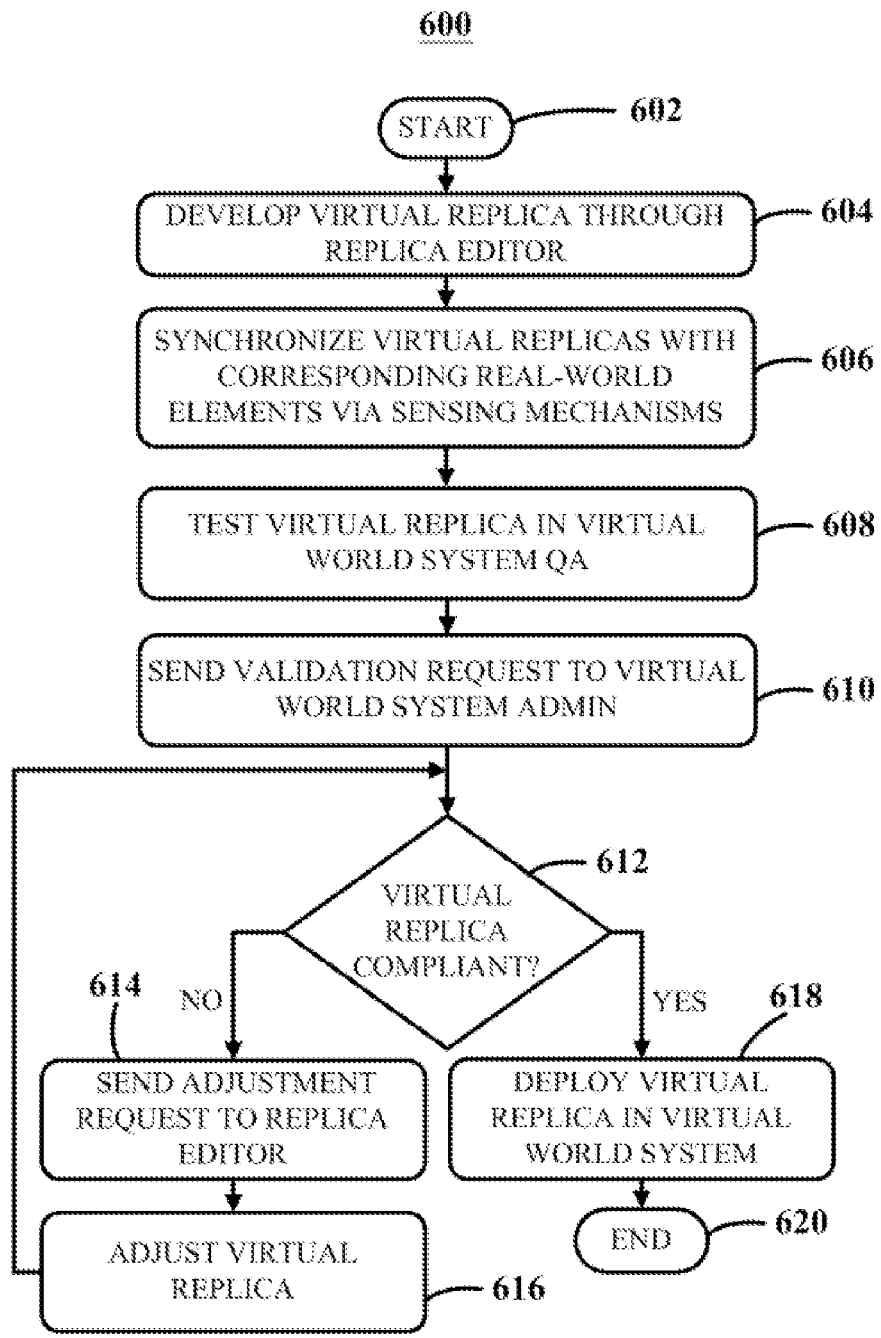
FIG. 6 depicts a block diagram of a method for developing, testing, and deploying a virtual replica of a real-world element into a persistent virtual world system, according to an embodiment.

FIG. 6 depicts a block diagram of a method for developing, testing, and deploying a virtual replica of a real-world element into a persistent virtual world system, according to an embodiment. The method 600 may be implemented in a system, such as the system shown with reference to FIGS. 1-5.

Method 600 begins in blocks 602 and 604 by developing, by a virtual replica developer via a replica editor, a virtual replica of a corresponding real-world element. Developing the virtual replicas may also include setting-up, via the replica editor, the virtual replica configuration comprising setting of location, physics, and operation settings, artificial intelligence settings of the virtual replicas, and performing tests of the developed virtual replicas. Thereafter, the method 600 continues in block 606 by synchronizing the virtual replicas with corresponding real elements, which may be done by receiving and processing multi-source data received via devices comprising sensing mechanisms. In an alternative embodiment, the real-world element may not yet be available, such as when not yet comprising sensing mechanisms or not being yet built or installed. In this case, the virtual replica of such real-world elements may be based on simulations performed within the persistent virtual world system. In block 608, the method 600 continues by testing, by the virtual replica developer, the synchronized virtual replicas via the replica editor.

In block 610, if virtual replica is approved by the virtual replica developer, the method 600 may proceed by sending a validation request to a persistent virtual world system administrator. In check 612, the method 600 may proceed by the persistent virtual world system administrator checking and determining via a virtual world-based QA system whether the virtual replica is compliant, which may comprise performing tests on the virtual replicas. Checking for compliance may be performed based on a set of rules which may be related to the appearance, physics, location, and other data related to the virtual replicas with respect to the corresponding real-world elements. If the virtual replica is not compliant, the method 600 continues in block 614 by the persistent virtual world system administrator sending, via the virtual world-based QA system, application adjustment requests to the replica editor. The replica developer may then proceed in block 616 by adjusting the virtual replica via the replica editor. Otherwise, if the virtual replica is compliant, the method 600 continues by the persistent virtual world system administrator deploying via the virtual world-based QA system the virtual replica into the persistent virtual world system 108, as viewed in block 618, thereafter finishing the process in terminator block 620.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A system for developing and deploying virtual replicas of real-world elements, the system comprising:
a server system comprising one or more server computers, each server computer comprising a memory and a processor, the server system storing a persistent virtual world system comprising virtual replicas of real-world elements, the virtual replicas having self-computing capabilities, the server system further storing a replica editor configured to input explicit data and instructions to the virtual replicas, and a virtual world-based quality assurance system configured to test and validate the virtual replicas,
wherein the server system is configured to receive multi-source data from devices connected to the server system via a network, and to use the received multi-source data to synchronize and update in real-time the virtual replicas.

2. The system of claim 1, wherein the devices connected to the server system include user devices configured to access the persistent virtual world system, replica editor, and virtual world-based quality assurance system, or other devices configured in a plurality of areas of the real world to update the persistent virtual world system via the multi-source data, or a combination thereof.

3. The system of claim 1, wherein the replica editor comprises modeling tools, location and space settings, physics settings, operation settings, artificial intelligence module, data synchronization module, or a replica testing module, or combinations thereof.

4. The system of claim 3, wherein the modeling tools comprise 3D game engine software development kits.

5. The system of claim 3, wherein the modeling tools enable generating virtual replicas with explicit data and instructions based on CAD and CAE models of the real-world elements.

6. The system of claim 3, wherein the modeling tools enable a car or drone-based image-scanning pipeline to be input through photo, video, depth measurements, simultaneous location and mapping (SLAM) scanning, or radar-imaging techniques, or combinations thereof in order to model the virtual replicas.

7. The system of claim 3, wherein the data synchronization module enables processing and incorporation of multi-source data into the virtual replicas enabling a one-way or two-way synchronization of virtual replicas with the corresponding real-world elements.

8. The system of claim 1, wherein the explicit data and instructions input through the replica editor describe a shape, location, position and orientation, physical properties, or expected functioning and impact of the real-world elements, or a combination thereof.

9. The system of claim 1, wherein the multi-source data further comprises contextual data, the contextual data comprising micro-context immediately affecting a real-world element, and macro-context derived from a plurality of micro-contexts.

10. The system of claim 1, wherein the virtual replicas are based on simulated data of unconnected real-world elements.

11. A method performed by a server system including one or more server computers having memory and one or more processors, the method comprising:
- providing a persistent virtual world system comprising virtual replicas of real-world elements, the virtual replicas having self-computing capabilities, a replica editor configured to input explicit data and instructions to the virtual replicas, and a virtual world-based quality assurance system configured to test and validate the virtual replicas;
- receiving, from devices connected to the server system, multi-source data; and
- synchronizing and updating in real-time the virtual replicas.

12. The method of claim 11 further comprising:
- developing, by a virtual replica developer via the replica editor, at least one of the virtual replicas;
- synchronizing, using the multi-source data, the at least one virtual replica with one or more corresponding real-world elements;
- testing, by the virtual replica editor, the synchronized at least one virtual replica;
- if the at least one virtual replica is approved by the virtual replica editor, sending a validation request to a persistent virtual world system administrator via the virtual world-based quality assurance system;
- validating, by the persistent virtual world system administrator, the at least one virtual replica via the virtual world-based quality assurance system;
- if the at least one virtual replica is not compliant, sending, by the persistent virtual world system administrator, one or more application adjustment requests to the virtual replica developer;
- adjusting, by the virtual replica developer, the at least one virtual replica via the replica editor; and
- if the at least one virtual replica is compliant, deploying, by the virtual replica administrator via the virtual world-based quality assurance system, the at least one virtual replica into a deployed persistent virtual world system.

13. The method of claim 12, wherein developing the at least one virtual replica further comprises employing modeling tools, location and space settings, physics settings, operation settings, an artificial intelligence module, a data synchronization module, or a replica testing module, or combinations thereof.

14. The method of claim 13, wherein the modeling tools comprise 3D game engine software development kits.

15. The method of claim 13 wherein the modeling tools enable generating virtual replicas with explicit data and instructions based on CAD and CAE models of the real-world elements.

16. The method of claim 13, wherein modeling tools enable a car or drone-based image-scanning pipeline to be input through photo, video, depth measurements, simultaneous location and mapping (SLAM) scanning, or radar-imaging techniques, or combinations thereof in order to model the virtual replicas.

17. The method of claim 13, wherein the data synchronization module enables processing and incorporation of multi-source data into the virtual replicas enabling a one-way or two-way synchronization of virtual replicas with the corresponding real-world elements.

18. The method of claim 11, wherein the multi-source data comprises contextual data, the contextual data comprising micro-context immediately affecting a real-world element, and macro-context derived from a plurality of micro-contexts.

19. The method of claim 11, wherein the virtual replicas are based on simulated data of unconnected real-world elements.

20. One or more non-transitory computer readable-media having stored thereon instructions configured to cause a server computer system comprising memory and at least one processor to perform steps comprising:
- providing a persistent virtual world system comprising virtual replicas of real-world elements, the virtual replicas having self-computing capabilities, a replica editor configured to input explicit data and instructions to the virtual replicas, and a virtual world-based quality assurance system configured to test and validate the virtual replicas; and
- receiving, from computing devices connected to the server, multi-source data that serves to synchronize and update in real-time the virtual replicas.

* * * * *